United States Patent [19]
Hashimoto et al.

[11] Patent Number: 5,198,761
[45] Date of Patent: Mar. 30, 1993

[54] TEMPERATURE COMPENSATED MAGNETOSTRICTIVE PISTON POSITION DETECTOR

[75] Inventors: Hisayoshi Hashimoto, Ushiku; Morio Tamura, Tsuchiura; Ken Ichiryuu, Ibaraki, all of Japan

[73] Assignee: Hitachi Construction Machinery Co., Ltd., Tokyo, Japan

[21] Appl. No.: 655,369
[22] PCT Filed: Mar. 6, 1990
[86] PCT No.: PCT/JP90/00287
§ 371 Date: Feb. 28, 1991
§ 102(e) Date: Feb. 28, 1991

[51] Int. Cl.⁵ ............................................. G01B 7/14
[52] U.S. Cl. ........................... 324/207.12; 324/207.13
[58] Field of Search ......... 324/207.13, 207.22–207.26, 324/209, 239, 260–262, 207.17, 207.12, 226, 225; 73/597, 632, 779; 428/36.7, 36.9, 35.9

[56] References Cited

U.S. PATENT DOCUMENTS

| | | | |
|---|---|---|---|
| 4,071,818 | 1/1978 | Krisst | 324/207.13 |
| 4,654,590 | 3/1987 | Kitaura et al. | 324/207.13 |
| 4,678,993 | 7/1987 | Vinnemann et al. | 324/207.13 |
| 4,749,071 | 6/1988 | Taylor | 428/36.7 X |
| 5,115,195 | 5/1992 | Peterson et al. | 324/207.13 |

FOREIGN PATENT DOCUMENTS

| | | | |
|---|---|---|---|
| 0130578 | 1/1985 | European Pat. Off. | 324/207.13 |
| 57-022512 | 2/1982 | Japan | 324/207.13 |
| 63-249628 | 1/1988 | Japan . | |
| 63-238415 | 3/1988 | Japan . | |
| 63-166522 | 7/1988 | Japan . | |

OTHER PUBLICATIONS

Mohri et al., "New Distance Sensors Using Amorphous Ferromagnetic Ribbons", *Bullikyushu Inc. Technol.* (Sci. & Technol.), No. 39 (Japan), Sep. 1979, pp. 73–77.
Panasenko, "Displacement Transducer", *Society Journal of Instrumentation and Control*, No. 1, Jan. 1969, pp. 52–53.

Primary Examiner—Gerard R. Strecker
Assistant Examiner—Warren S. Edmonds
Attorney, Agent, or Firm—Fay, Sharpe, Beal, Fagan, Minnich & McKee

[57] ABSTRACT

A piston cylinder device having a piston stroke measurement includes a cylinder tube (1) having an inner tube (2) made of a nonmagnetic material and an outer tube (3) formed on the outer peripheral surface of the inner tube and made of a fiber-reinforced resin material. A piston (76) fixed to a rod (75) is disposed slidably inside the cylinder tube. A stroke detector is composed of a position indicating magnet (80) disposed in the piston and an elongated sensor (81) disposed in the cylinder tube. The elongated sensor includes a thin elongated pipe (82) extending along the cylinder tube between both of its ends and holds at least one magnetostriction line (87) having a large magnetostriction coefficient, a driving coil (84) wound on at least one of the ends of the thin elongated pipe. A pulsed input current to the drive coil causes magnetostriction phenomenon on the magnetostriction line generating an ultrasonic wave. A detecting coil (86) wound on the thin elongated pipe in a predetermined length separately from the driving coil induces a detection signal generated by reverse magnetostriction when the ultrasonic wave passes by the position of the magnetostriction line corresponding to the position indicating magnet. Also, at least one pin-like magnet (20A, 42A) for correcting a measurement error due to a temperature change of the stroke detector, and disposed at a position adjacent to the detecting coil (86) and more inward in the axial direction than both ends of the detection coil are fixed to both ends of the cylinder tube (1).

9 Claims, 7 Drawing Sheets

TEMPERATURE COMPENSATED MAGNETOSTRICTIVE PISTON POSITION DETECTOR

TECHNICAL FIELD

The present invention relates to a cylinder apparatus made of a composite material comprising a cylinder tube made of a nonmagnetic material consisting of a fiber-reinforced resin material, and particularly to a cylinder apparatus made of a composite material comprising a stroke sensor for detecting the stroke of a piston.

BACKGROUND ART

Conventional stroke sensors of cylinder apparatuses made of a composite material comprise a stroke sensor disclosed in JP, A, 63-238415 which employs the magnetostriction effect. This stroke sensor has a cylinder tube comprising an inner cylinder made of a nonmagnetic material and an outer cylinder formed by winding a fiber material consisting of a strand of continuous filaments impregnated with a resin on the outer periphery of the inner cylinder. A position indicating magnet is provided on the piston which is slidably disposed in the cylinder tube, and an elongated sensor body, which employs the magnetostriction effect, is interposed between the inner and outer cylinders of the cylinder tube. The sensor body comprises a thin elongated tube containing an amorphous ribbon, a drive coil wound at one end of the thin elongated tube for inducing the magnetostriction phenomenon in the amorphous ribbon and generating an ultrasonic wave when a pulsatile input current is applied to the thin elongated tube, and a detection coil wound over a predetermined length of the thin tube for detecting as a detection signal the induced electromotive force generated by the inverse magnetostriction phenomenon when the ultrasonic wave passes through a position of the amorphous ribbon, which corresponds to the position indicating magnet. Because the time taken from the application of the pulsatile input current to the detection of the detection signal depends upon the piston stroke, the piston stroke can be detected by measuring the time.

On the other hand, since the sonic speed of the ultrasonic wave generated depends upon the temperature of the apparatus, an increase in oil temperature of the cylinder apparatus causes changes in the sonic speed of the ultrasonic wave and the above-described time and thus causes error in the measurement. JP, A, 63-238415 therefore proposes temperature compensation methods for correcting the measurement error produced. In a first method, a fixed compensating magnet is embedded at a predetermined position between the inner and outer cylinders, the induced electromotive force, which is produced by the inverse magnetostriction phenomenon when the ultrasonic wave passes through the fixed magnet, is detected as a second detection signal, and the distance between the drive coil and the fixed magnet is used as a reference distance for temperature compensation so that the detection signal generated by the position indicating magnet is corrected by using the reference distance and the time taken from the application of the pulsatile input current to the detection of the second detection signal. In a second method, one of two magnets, which are disposed at both axial ends of the piston, is also used as a magnet for indicating the position of the piston, the induced electromotive forces obtained from the two magnets are detected as detection signals, and the distance between the two magnets is used as a reference distance for temperature compensation so that the detection signal generated from the position indicating magnet is corrected by using the time difference between the two detection signals and the reference distance.

However, the above-mentioned temperature compensation methods have the following problems:

In the first method, although the distance between the detection coil and the fixed compensating magnet is used as the reference distance, the reference distance cannot be measured unless the positions of the detection coil and the fixed magnet are determined. Since the drive coil itself has a certain length, the position of the drive coil cannot be correctly determined. Further, the fixed compensating magnet is disposed on the outer surface of the inner cylinder formed, and the outer cylinder is then formed thereon. However, the position of the fixed magnet is easily shifted when a fiber material is wound for forming the outer cylinder. In addition, since both the drive coil and the fixed magnet are buried in positions between the inner and outer cylinders, the positions of the drive coil and the fixed magnet cannot be seen from the outside after the cylinder tube has been completely formed. For the above reasons, the distance between the detection coil and the fixed magnet cannot be accurately measured, and the accuracy of temperature compensation thus deteriorates.

In the second method, although the distance between the two magnets provided on the piston is used as the reference distance, the two magnets cannot be seen from the outside after the piston has been incorporated in the cylinder tube. Further, the accuracy of compensation increases with an increase in the reference distance. In this method, however, because the distance between the two magnets is short due to the short length of the piston itself, it is impossible to ensure that the reference distance has a sufficient length. For the above reasons, this method also has a problem with respect to the low accuracy of temperature compensation.

Examples of prior art related to a cylinder, which is formed by winding a strand of continuous filaments impregnated with a resin, include JP, A, 63-166522 and 63-249628.

It is an object of the present invention to provide a cylinder apparatus made of a composite material comprising a stroke sensor which enables an improvement in accuracy of temperature compensation for a change in environmental temperature such as the oil temperature or the like and which enables the precise measurement of the piston stroke.

DISCLOSURE OF THE INVENTION

In order to achieve the object, the present invention provides a cylinder apparatus made of a composite material comprising a cylinder tube having an inner cylinder made of a non-magnetic material and an outer cylinder formed on the outer periphery of the inner cylinder and made of a fiber-reinforced resin material, a piston slidably disposed in the cylinder tube, a rod having an end fixed to the piston and the other end outwardly projecting from the cylinder tube, and a stroke sensor for detecting the stroke of the piston, the stroke sensor comprises a position indicating magnet provided on the piston and elongated sensor means provided on the cylinder tube, the elongated sensor means having a thin elongated tube extending along the cylinder tube between both ends thereof and containing at least one magnetostriction string having a high coefficient of magnetostriction, a drive coil wound on at least one of both ends of the thin elongated tube for producing magnetostriction phenomenon for generating an ultrasonic wave when a pulsatile input current is applied thereto, and a detection coil wound over a predetermined length of the thin elongated tube separately from the drive coil for detecting as a detection signal the induced electromotive force generated by the inverse magnetostriction phenomenon when the ultrasonic wave is passed through the position of the magnetostriction string corresponding to the position indicating magnet, wherein at least one pin-like magnet for correcting a measurement error due to a change in temperature of the stroke sensor is disposed at each of portions axially inward of both ends of the detection coil and adjacent thereto in the vicinity of both ends of the cylinder tube.

In a preferred embodiment, the pin-shaped magnet is provided as a radial protrusion on each of two mount members fitted to the opposite axial ends of the inner cylinder, and the outer cylinder is formed by winding a fiber material impregnated with a resin on the outer periphery of the inner cylinder while guiding the material by the radial protrusions.

In a preferred embodiment, the elongated sensor means is interposed between the inner and outer cylinders. The elongated sensor means may be disposed on the outer periphery of the outer cylinder. In this case, the outside of the sensor means is coated with a protective layer made of an elastic material.

In a preferred embodiment, at least one other radial protrusion is further provided on at least one of the two mount members for guiding the fiber material, the other protrusion comprising electrode means for leading out the lead wires of the drive coil and the detection coil to the outside of the cylinder.

In a preferred embodiment, the magnetostriction string contains a plurality of amorphous wires.

BEST MODE FOR CARRYING OUT THE INVENTION

Preferred embodiments of the present invention are described below with reference to the drawings.

Figure 1:
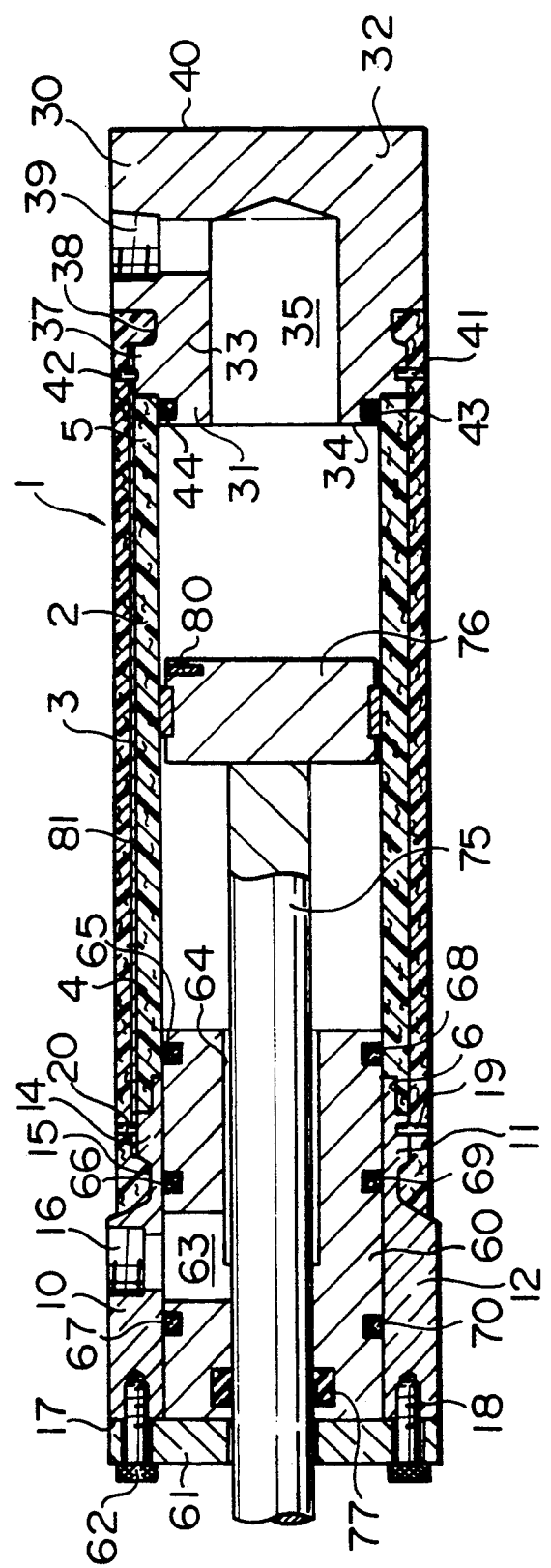
FIG. 1 is a sectional view of a cylinder apparatus in accordance with an embodiment of the present invention.

In FIG. 1, a cylinder apparatus made of a composite material according to an embodiment of the present invention has a body comprising a cylinder tube 1 which has an inner cylinder 2 made of fiber-reinforced resin and an outer cylinder 3 made of a fiber-reinforced resin.

The inner cylinder 2 is formed in an elongated cylindrical shape having one or a plurality of wound layers formed by cross winding under tension a fiber material consisting of a strand of continuous filaments impregnated with a resin at a constant winding angle by a filament winding method or the like until a predetermined thickness is obtained in the same way as the outer cylinder later described. The winding angle is preferably close to 90°, for example, 40° to 90°, with respect to the central axis, which is different from that of the outer cylinder. The inner cylinder 1 may be made of any one of other nonmagnetic materials such as stainless steel, aluminum, ceramics or the like.

The inner periphery of one 4 of the axial opposite ends 4, 5 of the inner cylinder 2 has circumferential cut portion 6 by machining by means of lathe or the like to provide a stepped shape.

A cylindrical mount member 10, which is made of a nonmagnetic material such as stainless steel, aluminum, ceramics or the like and which also serves as a rod cover for the cylinder tube, is fitted to the axial end 4 of the inner cylinder 2 having the stepped shape. The mount member 10 has a first small-diameter portion 11 near the inner cylinder 2 and a second large-diameter portion 12 far from the inner cylinder 2.

The first portion 11 has an axial end 14 having a stepped shape complementary to the above-described stepped shape of the axial end 4 of the inner cylinder 2 and having a cylindrical outer peripheral surface having substantially the same diameter as that of the outer peripheral surface of the inner cylinder 2. The first portion 11 is engaged with the axial end 4 at the portion of the complementary stepped shape, the engaging surfaces being strongly joined to each other by an adhesive. The first portion 11 also has a circumferential recess 15 in a portion of the outer periphery adjacent to the second portion 12. The circumferential recess 15 functions to provide a fiber well for containing a strand of continuous filaments returned when the outer cylinder 3 is formed as described below.

The second portion 12 has an outer peripheral surface having a diameter greater than that of the outer peripheral surface of the axial end 14 of the first portion 11, and provided with a radial port 16 opened in the outer peripheral surface for supplying and discharging a working fluid. The second portion 12 also has a flat end surface 17 provided with a plurality of axial bolt holes 18. The structure having the port 16, the end surface 17 and the bolt holes 18 allows the mount member 10 to serve as a rod cover.

In addition, the axial end 14 of the first portion 11 has a plurality of small radial holes 19 formed in a portion of the outer peripheral surface thereof adjacent to the recess 15 at substantially equal intervals in the circumferential direction. A pin 20 is inserted into each of the small holes 19 and securely fixed by an adhesive. Each of the pins 20 is made of a high-strength member of a metallic material and has a tip portion radially projecting from the outer peripheral surface of the axial end 14 by a predetermined length. The projecting portion of each of the pins 20 serves as a radial protrusion for guiding and returning the strand of continuous filaments when the outer cylinder 3 is formed as described below.

A second mount member 30 is fitted to the other end 5 of the inner cylinder 2. The second mount member 30 is made of a nonmagnetic material in the same way as the mount member 10, and also serves as a bottom cover for the cylinder tube. The mount member 30 has a first small-diameter portion 31 disposed radially inward of the inner cylinder 2, a second large-diameter portion 32 far from the inner cylinder 2 and a third intermediate-diameter portion 33 between the first and second portions.

The first portion 31 has a cylindrical outer peripheral surface fitted to the inner peripheral surface of at the axial end 5 of the inner cylinder 2 and an end surface 34 placed in the inner cylinder 2, and a hole 35 axially extending to an intermediate position of the second portion 32 is opened in the end surface 34.

The third portion 33 has a cylindrical portion 37 having an outer peripheral surface with substantially the same diameter as that of the outer peripheral surface of the inner cylinder 2. The first portion 31 and the cylindrical portion 37 form a stepped portion with which the axial end 5 of the inner cylinder 2 is engaged, the engaging surfaces being strongly joined to each other by an adhesive. The third portion 33 also has a circumferential recess 38 in a portion of the outer peripheral surface thereof adjacent to the second portion 32. The recess 38 serves to provide a fiber well like the above-described recess 15.

The second portion 32 has an outer peripheral surface having a diameter greater than that of the outer peripheral surface of the cylindrical portion 37 of the third portion 33 and a radial port 39 communicating with the hole 35 for supplying and discharging a working fluid. The second portion 32 also has a closed end surface 40. The structure having the port 39 and the closed end surface 40 allows the mount member 30 to serve as a bottom cover.

Further, a plurality of small radial holes 41 similar to the small holes 19 of the mount member 10 are formed in a portion of the outer peripheral surface of the cylindrical portion 37 adjacent to the recess 38 in the third portion 33. A plurality of pins 42 are respectively inserted into the small holes 41 and fixed by an adhesive in the same way as the pins 20. The projecting portion of each of the pins 42 serves as a radial protrusion for guiding and returning the fiber material when the outer cylinder 3 is formed, like the projecting portion of each of the pins 20.

The first member 31 also has an annular groove 43 which is formed in the outer periphery thereof and an elastic sealing element such as an O-ring 44 is fitted in the annular groove 43 together with a backup ring (not shown) used for preventing the O-ring 44 from springing out. The O-ring 44 elastically contacts with the inner peripheral surface of the axial end 5 of the inner cylinder 2. The O-ring 44 has the function of sealing the portion between the inner peripheral surface of the inner cylinder 2 and the outer peripheral surface of the first portion 31 of the mount member 30 so as to prevent the pressure of the working fluid introduced into the cylinder tube, i.e, the internal pressure, from acting on the axial end 5 of the inner cylinder 2. This prevents the occurrence of a difference in elongation, i.e., non-uniform distortion, based on a difference in rigidity from the mount member 30 in the corresponding portion of the cylinder tube 1.

Figure 2:
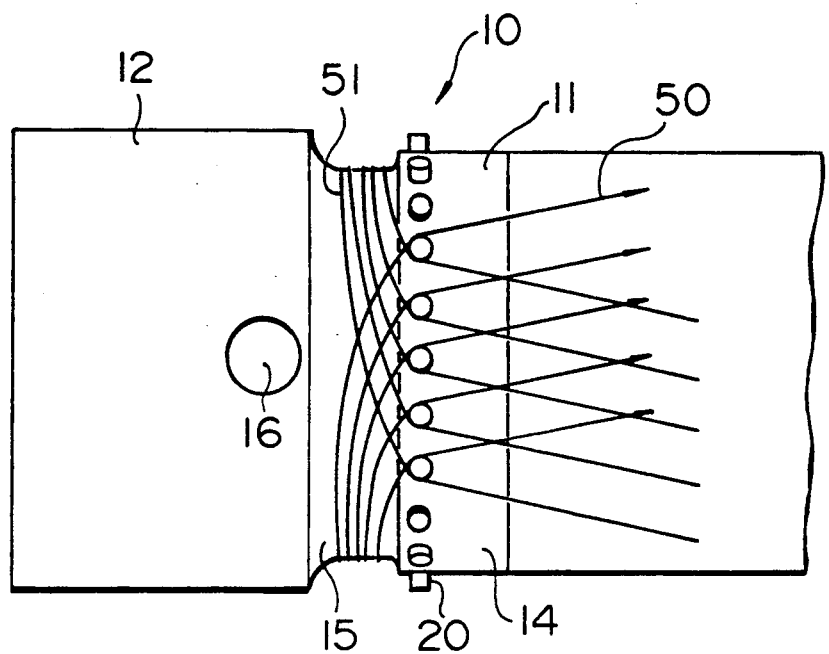
FIG. 2 is an explanatory view of the formation of an outer cylinder on the rod cover side of a cylinder tube.
Figure 3:
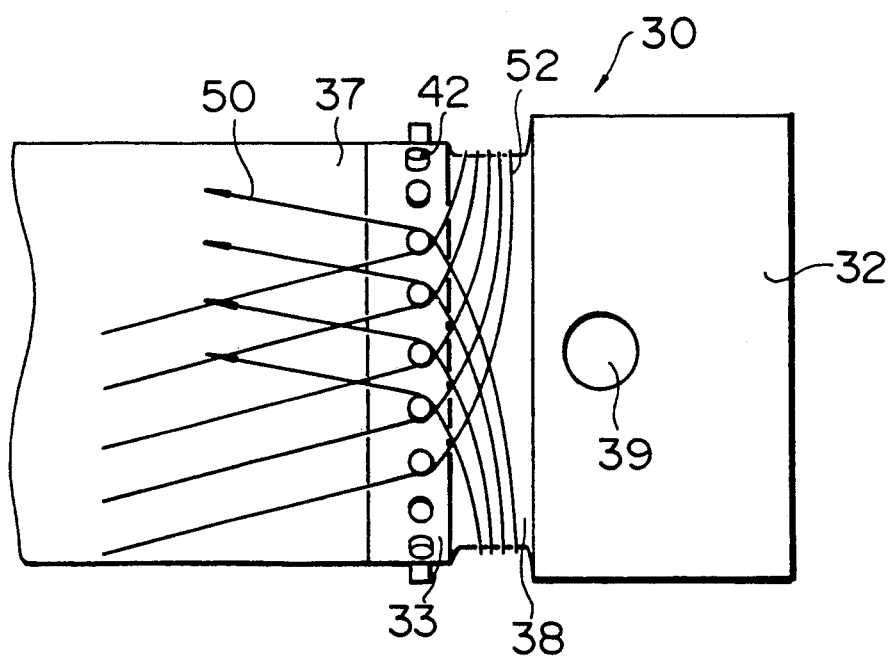
FIG. 3 is an explanatory view of the formation of an outer cylinder on the bottom cover side of a cylinder tube.

The outer cylinder 3 is formed on the outer periphery of the inner cylinder 2 by winding a fibrous material 50 (refer to FIGS. 2 and 3) composed of a strand of continuous filaments impregnated with a resin over a region from the outer periphery of the inner cylinder 2 to the outer periphery of the first portion 11 of the mount member 10 and the outer periphery of the third portion 33 of the mount member 30. The outer cylinder 3 is formed in a substantially cylindrical shape having one or plurality of wound layers formed by a cross-winding the fibrous material 50 under tension at a constant winding angle close to 0°, for example, about 5° to 60°, with respect to the central axis by a filament winding method or the like until a predetermined thickness is obtained. During the cross-winding, as shown in FIGS. 2 and 3, the fibrous material 50 is guided by the pins 20 and 42 so as to be changed in its direction and wound on each of the recesses 15 and 38 for a predetermined angle, for example, 180°, to form each of returning portions 51, 52. The fibrous material 50 is then guided by the pins 20 and 42 again so as to be changed in its direction and then returned to the outer periphery of the inner cylinder 2. This causes the mount members 10 and 30 to be securely combined with the axial ends 4 and 5 of the inner cylinder 2, respectively.

Examples of materials which may be used as the fibrous material 50 include carbon fibers, glass fibers, aramid fibers, alumina fibers, silicon carbide fibers and the like. Examples of resins with which the fibrous material 50 is impregnated include epoxy resins, polyester resins, polyimide resins and the like, all of which have thermosetting properties and adhesive properties. Examples of materials for the inner cylinder 2 include the same as those described above.

A cylindrical rigid body 60, which is made of a non-magnetic material such as stainless steel, aluminum, ceramic materials or the like, like the mount member 10, is inserted into the axial end 4 of the inner cylinder 2 and the mount member 10. A cover body 61 is fitted to the end surface 17 of the second portion 12 of the mount member 10 and fixed by bolts 62 which respectively engage with bolt holes 18. The rigid body 60 is fixed to the cover body 61 by bolts (not shown).

The rigid body 60 has a radial passage 63 and an axial passage 64 for a working fluid which communicate with the port 16 of the mount member 10. The rigid body 60 also has three annular grooves 65, 66, 67 formed in the outer periphery thereof and elastic sealing elements, i.e., O-rings 68, 69, 70, are respectively fitted in the grooves 65, 66, 67 together with backup rings for preventing the O-rings 68, 69, 70 from springing out. The O-ring 68 elastically contacts with the inner peripheral surface of the axial end 4 of the inner cylinder 2, and the O-ring 69 elastically contacts with the inner peripheral surface of the mount member 10 at a position axially inward of the radial passage 63. The O-ring 70 elastically contacts with the inner peripheral surface of the mount member 10 at a position axially outward of the radial passage 63.

The O-ring 68 has the function of sealing the portion between the inner periphery of the inner cylinder 2 and the outer periphery of the rigid body 60 so as to prevent the internal pressure of the cylinder tube from acting on the axial end 4 of the inner cylinder 2 from the side of the inner cylinder 2. The O-ring 69 has the function of sealing the portion between the inner periphery of the mount member 10 and the outer periphery of the rigid body 60 so as to prevent the internal pressure of the cylinder tube from acting on the axial end 4 of the inner cylinder 2 from the side of the radial passage 63. This prevents the occurrence of a difference in elongation, i.e, non-uniform distortion, based on a difference in rigidity from the mount member 10 in the corresponding portion of the cylinder tube 1. The O-ring 70 has the function of sealing the portion between the inner periphery of the mount member 10 and the outer periphery of the rigid body 60 so as to prevent the internal pressure of the cylinder tube from leaking through the radial passage 63 to the outside of the cylinder tube.

As shown in FIG. 1, a rod 75 is movably inserted into the central portions of the rigid body 60 and the cover body 61 in a liquid-tight manner, and a piston 76, which performs reciprocating motion in the inner cylinder 2, is fitted at the end of the rod 75. The piston 76 is made of a nonmagnetic material such as a fiber-reinforced resin material containing short fibers, stainless steel or the like.

The cylinder apparatus configured as described above also includes a stroke sensor for detecting the stroke of the piston 76. The stroke sensor generally comprises a position indicating magnet 80 embedded in the outer periphery of the piston 76 and an elongated sensor body 81 interposed between the inner cylinder 2 of the cylinder tube 1 and the outer cylinder 3 thereof and extending over substantially the total length of the cylinder tube 1.

The position indicating magnet 80 comprises a permanent magnet and is provided at a position near the end surface of the piston 76 so that one end thereof faces to the inner periphery of the inner cylinder 2.

Figure 4:
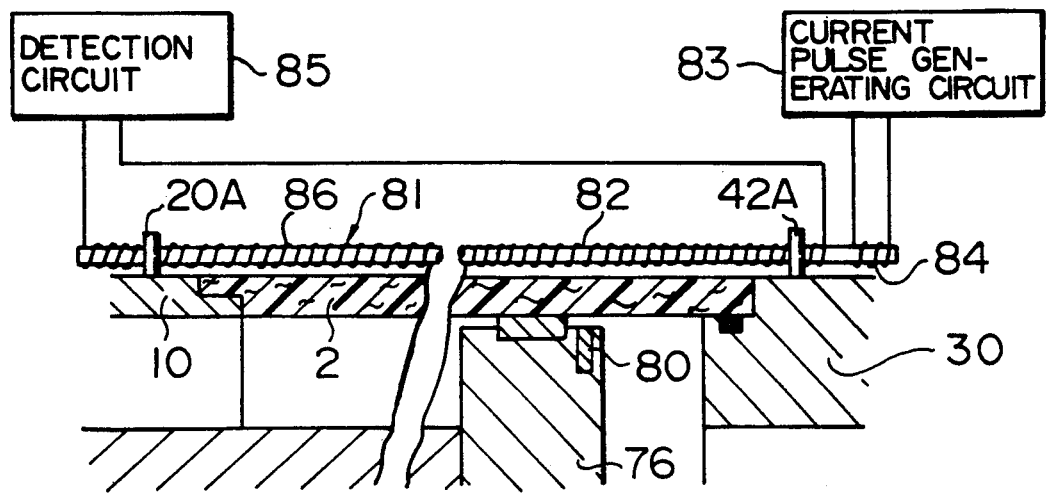
FIG. 4 is an enlarged sectional view of the cylinder tube shown in FIG. 1 before the formation of an outer cylinder.
Figure 5:
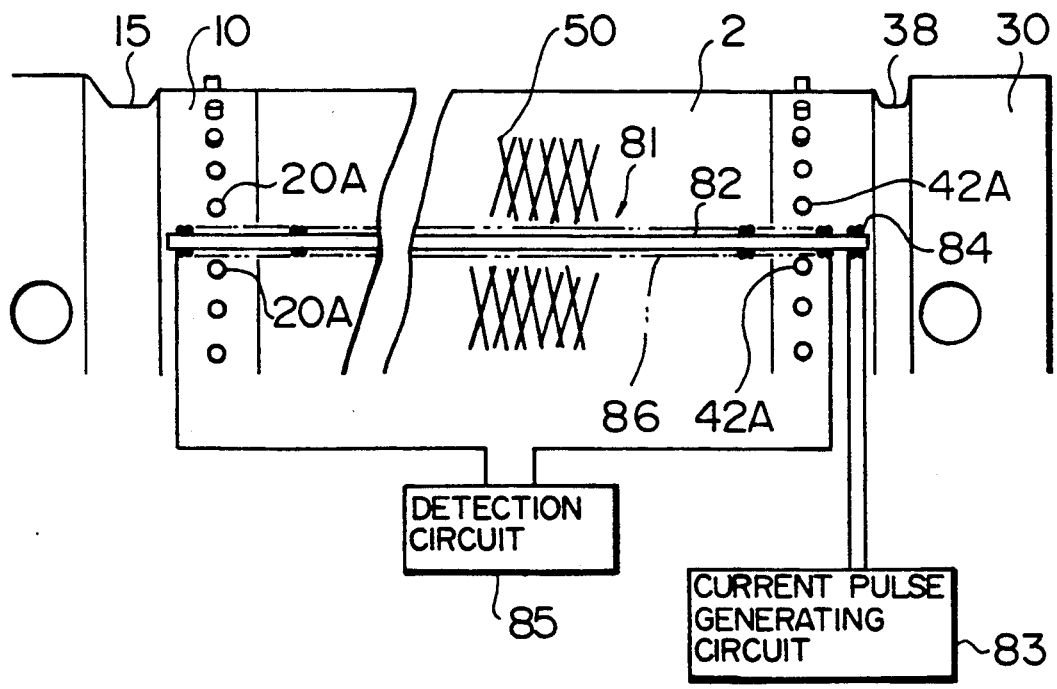
FIG. 5 is a plan view of the same cylinder before the formation of the outer cylinder.

As shown in FIGS. 4 and 5, the sensor body 81 comprises a thin elongated tube 82 containing magnetostriction strings described below, a drive coil 84 wound over a short distance at one end of the tube 82 and applied with a pulsatile input current a (refer to FIG. 7) from a current pulse generating circuit 83, and a detection coil 86 wound over the substantially entire length of the remaining portion of the tube 82 so as to generate induced electromotive powers b, c, d, e (refer to FIGS. 8 and 10) which is output as detection signals by a detection circuit 85.

Figure 6:
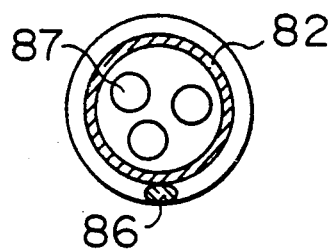
FIG. 6 is a sectional view of a sensor body.

The thin elongated tube 82 is made of an insulating material such as Teflon and has an internal diameter of, for example, about 1 mm. The tube 82 contains three amorphous wires 87 each of which serves as a magnetostriction string having a high coefficient of magnetostriction and has a diameter of about 0.1 mm, as shown in FIG. 6. Each of the amorphous wires 87 is made of, for example, an iron-based amorphous ferromagnetic alloy. The tube 82 extends over the entire length of the inner cylinder 2 and, on the side of the mount member 10, further extends between the adjacent two pins 20A, 20A of the pins 20 up to a position near the recess 15, and on the side of the mount member 30, similarly further extends between the two adjacent pins 42A, 42A of the pins 42 up to a position near the recess 38. The tube 82 is sealed at its both ends by a vibration-proof material such as sponge, cotton or the like (not shown) for preventing reflection of the ultrasonic wave described below.

Further, at least one of the two adjacent pins 20A, 20A and at least one of the pins 42A, 42A between which the thin elongated tube 82 is passed are made of a magnetic material such as an iron-type metal, and the pins 20A, 42A are magnetized. Namely, the pins 20A, 42A are made as permanent magnets. This enables the pins 20A, 42A not only to play a role of guiding the fibrous material 50 as above mentioned but also to function as temperature compensating magnets for correcting the measurement error, which is produced by a change in temperature of the stroke sensor, by virtue of the magnetism of the pins.

A description will be given of a method of manufacturing the cylinder apparatus configured as described above.

A mandrel is prepared which has an outer diameter corresponding to the inner diameter of the cylinder tube 1 and an outer peripheral surface finished with a predetermined level of surface accuracy. In order to form the inner cylinder 2, a fibrous material consisting of a strand of continuous filaments impregnated with a resin is cross-wound under tension on the outer peripheral surface of the mandrel at a constant winding angle by using a filament winding method until a predetermined thickness is obtained. In this operation, one of the above-described materials, for example, carbon fibers, is used as the fibrous material, and one of the above-described materials, for example, epoxy resin, is used as the rein. The winding angle of the fibrous material is preferably close to 90°, for example, about 49° to 89°, and more preferably about 70°, with respect to the axis. This enables the inner cylinder 2 to bear the hoop force generated in the tube and thus improves resistance to the internal pressure.

The mandrel on which the fibrous material is wound is then placed in a thermosetting furnace (not shown) for thermosetting the resin with which the fibrous material is impregnated. After the mandrel has been removed, the thus-formed inner cylinder 2 is cut to a predetermined length by machining such as lathe or the like, while being formed with the cut portion 6 in the axial end 4 to provide a stepped shape. The outer periphery is appropriately ground to obtain a predetermined diameter and then roughly ground by using a sandpaper so that the adhesion to the outer cylinder 3 can be increased. The inner cylinder 2 may be further subjected to appropriate treatment for removing thermal distortion.

The mount members 10, 30 each having a predetermined shape are then prepared, and the pins 20, 42 each including at least one magnetic pin 20A, 42A are planted in the small holes 19, 41 of the mount members 10, 30 and fixed by an adhesive, respectively. The pins 20, 20A, 40, 40A may be respectively press-fitted in the small holes. In the first portion 31 of the mount member 30, the O-ring 44 is fitted in the annular groove 43 together with a backup ring. The mount members 10, 30, which are provided with the pins and the O-ring, as described above, are fitted to the axial ends 4, 5 of the inner cylinder 2, as shown in FIG. 1, and the engaging surfaces are secured by an adhesive.

After the adhesive has been cured, the sensor body 81 is disposed in such a manner that it extends over the overall length of the inner cylinder 2 and passes between the two pins 20A, 20A and between the 42A, 42A on the mount members 10, 30, respectively, as shown in FIGS. 4 and 5. In order to form the outer cylinder 3, the fibrous material 50 consisting of a strand of continuous filaments impregnated with a resin is wound on the outer periphery of the inner cylinder 2 and the outer peripheries of the mount members 10, 30, with the sensor body 81 disposed thereon, at a predetermined winding angle by using a filament winding method, while guiding the fibrous material 50 by the pins 20, 20A, 42, 42A. During this operation, one of the above-described materials, for example, carbon fibers, is used as the fibrous material 50, and one of the above-described materials, for example, epoxy resin, is used as the resin. The winding angle of the fibrous material 50 is preferably close to 0°, for example, 5° to 60°, with respect to the axis. This causes the outer cylinder 3 to bear bending force and tensile force and improves flexural strength and tensile strength of the cylinder tube 1.

During winding of the fibrous material 50, on the side of the axial end 4 of the inner cylinder 2, as shown in FIG. 2, the fibrous material 50 is stretched from the outer periphery of the inner cylinder 2 to the outer periphery of the first portion 11 of the mount portion 10 under predetermined tension, and changed in its direction while being guided by the pins 20, 20A. The fibrous material 50 is then wound for a predetermined angle, for example, 180°, on the recess 15 to form the returning portion 51. The fibrous material 50 is then changed in its direction while being guided by the pins 20, 20A again to return to the outer periphery of the inner cylinder 2. On the side of the axial end 5 of the inner cylinder 2, the fibrous material 50 is wound and then returned by using the pins 42, 42A and recess 38 on the mount member 30 in the same way as that described above, as shown in FIG. 3.

In this way, the fibrous material 50 is wound by using the pins 20, 20A, 42, 42A so that the mount members 10, 30 can be strongly combined with the axial ends 4, 5 of the inner cylinder 2. In addition, the provision of the recesses 15, 38 permits the smooth formation of the returning portions 51, 52 of the fibrous material 50, decreasing the bulge of the returning portions, while permitting the fibrous material 50 to be wound on the recesses 15, 38 at a predetermined angle. Thus the mount member 10, 30 can be securely and stably combined with the inner cylinder 2, as compared with a case where the fibrous material 50 is wound by using the pins 20, 20A, 42, 42A only, whereby the strength of the cylinder tube is increased.

In addition, since the outer periphery of each of the mount members 10, 30 on which the fibrous material 50 is wound is a cylindrical surface having the same diameter as that of the outer periphery of the inner cylinder 2, when the internal pressure produces axial tensile force acting on the cylinder tube, the tensile force does not act as the force of separating the fibrous material 50 from the outer peripheries of the mount members 10, 30, thereby preventing the outer cylinder 3 from separating from the inner cylinder 2. Further, since the fibrous material 50 is smoothly changed in its direction in the vicinities of the pins 20, 20A, 42, 42A, the concentration of stress acting on the fibrous material 50 and the load on the pins are decreased. Because the fibrous material 50 can be engaged with the root of each of the pins 20, 20A, 42, 42A, a sufficient amount of fibrous material 50 can be held by each of the pins 20, 20A, 42, 42A, and bending of each pin can be minimized. The strength of the cylinder tube 1 can thus be further increased.

After the outer cylinder 3 having a predetermined thickness has been formed on the outer periphery of the inner cylinder 2 and the outer peripheries of the mount members 10, 30, resultant product is placed in a thermosetting furnace (not shown) so that the resin impregnated in the fibrous material 50 is thermoset. If required, the outer periphery of the outer cylinder 3 is then finished to a smooth surface and predetermined dimensions by machining such as grinding or the like. During this finishing, when the tops of the pins 20, 20A, 42, 42A are buried in the outer cylinder 3, it is preferable to grind the outer periphery of the outer cylinder 3 until the tops of the pins are exposed to air so that the positions of the pins can be seen. In this way, the cylinder tube 1 is completed.

The rigid body 60 having a predetermined shape is then prepared. The rod 75 having at one end the piston provided with the position indicating magnet 80 is inserted into the central hole of the rigid body 60, and the O-rings 68, 69, 70 are fitted in the annular grooves 65, 66, 67 of the rigid body 60 together with the backup rings. The rigid body 60 is then inserted together with the piston 76 into the cylinder tube 1 through the opening of the mount member 10 of the cylinder tube 1, and the cover body 61 is then fitted to the end surface 17 of the mount member 10 and fixed thereto by the bolts 62. In this way, the cylinder apparatus of this embodiment is completed.

A description will now be given of the operation of the stroke sensor of this embodiment. The principle of the operation of the stroke sensor except the function of the pins 20A, 42A as temperature compensating magnets is first described below with reference to FIGS. 7 to 9.

Figure 7:
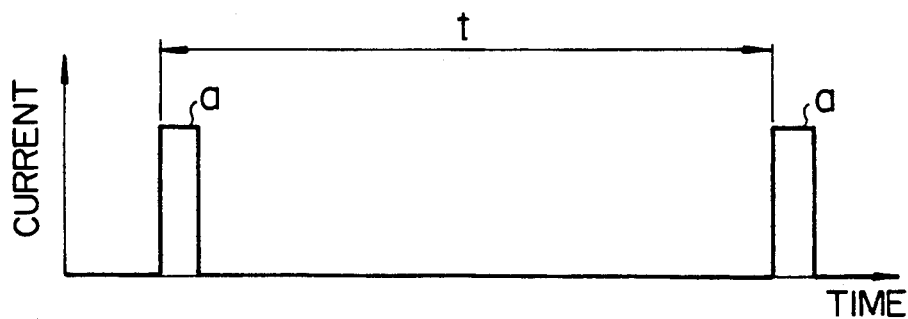
FIG. 7 is a drawing showing the characteristics of an input current for a drive coil.

The pulse current a shown in FIG. 7 is generated at a predetermined time interval t of, for example, 1 msec, by a current pulse generating circuit 83 and applied to the drive coil 84 of the sensor body 81. The pulse current a causes a rapid change in the magnetic field in the drive coil 84, and the change in the magnetic field causes the generation of an ultrasonic wave based on the magnetostriction phenomenon in the amorphous wires 87 in the thin elongated tube 82. The ultrasonic wave generated is propagated at a sound speed of, for example, about 5000 to 6000 m/s, through the tube 82 from the side thereof provided with the drive coil 84 to the other side.

Figure 8:
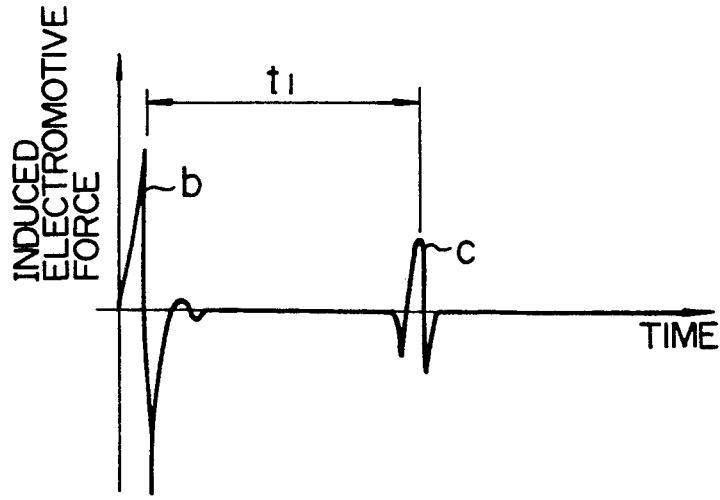
FIG. 8 is a drawing showing the characteristics of a detection coil for explaining the principle of a stroke sensor.

On the other hand, the induced electromotive force shown by b in FIG. 8 is generated by mutual induction in the detection coil 86 when the pulse current a shown in FIG. 7 is generated. The amorphous wires 87 are partially distorted in a portion corresponding to the position indicating magnet 80 by the magnetism of magnet 80. When the ultrasonic wave is propagated to the portion corresponding to the magnet 80, therefore, since the propagation of the ultrasonic wave is the same as the propagation of distortion because the ultrasonic wave is an elastic wave, the distortion causes a displacement in the portion of the amorphous wires 87 to occur so that the distortion of the amorphous wires 87 is increased. The magnetism is thus significantly changed by the inverse magnetostriction phenomenon, so that an electromotive force is produced in the detection coil 86.

The current produced by the electromotive force is shown by c in FIG. 8.

Figure 9:
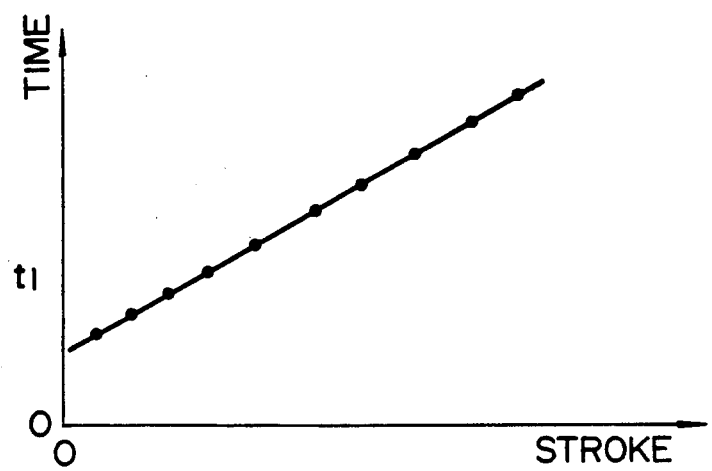
FIG. 9 is a drawing showing a relation between the stroke and detection time.

The detection circuit 85 detects the above-described currents b and c, which are produced in the detection coil 86, and reads the time difference t1 between the currents b and c. The time difference t1 is linearly proportional to the position of the piston 76, i.e., the piston stroke, as shown in FIG. 9. The piston stroke can thus be determined by reading the time difference t1.

The time difference t1 can be detected by generating a triangular wave voltage at the same time as the application of the current a and holding the value of the triangular wave voltage when the current c is generated. In this case, the time difference t1 is detected in a form converted into a voltage value. The time difference t1 may be measured by using a timer circuit, directly.

A description will now be given of the function of the pins 20A, 42A which serve as the temperature compensating magnets for the stroke sensor of this embodiment.

The pins 20A, 42A are disposed adjacent to the detection coil 86 axially inward of the both ends thereof at positions near the both ends of the cylinder tube 1. The amorphous wires 87 in the tube 82 are therefore partially distorted by magnetism in the portions corresponding to the pins 20A, 42A. When the ultrasonic wave is propagated to the portions corresponding to the pins 20A, 42A, a displacement takes place in the portions of the amorphous wires 87, and an electromotive force is produced in the detection coil 86 due to the inverse magnetostriction phenomenon.

Figure 10:
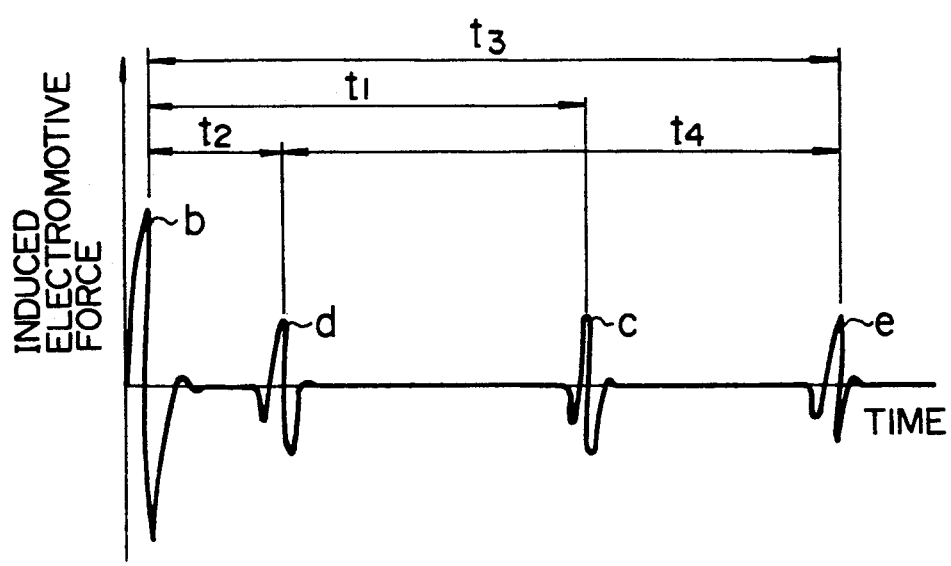
FIG. 10 is a drawing showing the characteristics of a detection coil of an embodiment of the present invention.

This state is shown in FIG. 10. After the current b has been generated due to the current pulse a, a current d is generated by the pins 42A disposed near the drive coil 84. After the current c has been then generated by the position indicating magnet 80 of the piston 76, a current e is generated by the pins 20A disposed adjacent to the end of the detection coil 86 opposite to the drive coil 84.

As described above, the time difference t1 between the current b and the current c corresponds to the stroke of the piston 76. The time difference t4=t2−t3 between the current d and the current e corresponds to the distance between the pins 20A and the pins 42A, which distance is constant. In this embodiment, the distance is used as a reference distance for temperature compensation.

Namely, during use of the cylinder apparatus, the temperature in the thin elongated tube 82 varies as the environmental temperature varies due to an increase in temperature of the pressure oil introduced into the cylinder tube, for example. Because the sound speed of the ultrasonic wave depends upon the temperature and thus varies as the environmental temperature varies, the time difference t1 is different before and after the change in environmental temperature even at the same position of the piston 76. Error is therefore produced in the measured value of the piston stroke when no temperature compensation is made.

In this embodiment, both the time differences t1 and t4 are read by the detection circuit 85. Assuming that the constant distance between the pins 20A and the pins 42A is a value L, the time difference t4 corresponds to the constant distance L. The constant distance L is previously stored as the reference distance for temperature compensation in the detection circuit 85 which performs the following calculation using the read time differences t1, t4 and the constant distance L:

$$t1 \times L/t4$$

wherein L/t4 represents the propagation distance per unit time of the ultrasonic wave. The piston stroke, which is not affected by temperature, can be obtained by multiplying this L/t4 value by t1. Namely, the measured value obtained by using as the reference distance the constant distance L is compensated for temperature.

In the above equation, the more the precision of the propagation distance L/t4 per unit time of the ultrasonic wave, the longer the reference distance L and the more the value of the reference distance L is correct. The accuracy of temperature compensation is increased with an increase in accuracy of the propagation distance L/t4. In this embodiment, since the pistons 20A, 42A, which provide the reference distance L, are disposed near the both ends of the cylinder tube 1, the reference distance L is longer than the full stroke of the piston 76. In addition, since the pins 20A, 42A are securely fixed to the mount members 10, 30, respectively, the pins do not move from the predetermined positions during the formation and thermosetting of the outer cylinder 3, and the reference distance L can be easily obtained in accordance with design. Further, since the pins 20A, 42A are exposed to the outer periphery of the outer cylinder 3, the pins can be seen from the outside, and the reference distance L can be easily confirmed. This enables the reference distance L to be precisely grasped in this embodiment.

This embodiment thus permits temperature compensation with extremely high accuracy even if the environmental temperature such as the oil temperature or the like varies during the use of the cylinder apparatus, and permits the detection of the piston stroke with extremely high accuracy.

In addition, this embodiment employs as temperature compensating magnets the pins 20A, 42A for guiding the fibrous material 50. This causes a reduction in number of the necessary parts and the simplification of the structure. When an exclusive magnet is interposed between the inner cylinder 2 and the outer cylinder 3, the magnet causes the separation of the outer cylinder from the inner cylinder. However, the pins 20A, 20B causes no separation of the outer cylinder from the inner cylinder, and therefore durability of the cylinder tube 1 is improved.

Further, since this embodiment employs as magnetostriction strings a plurality of amorphous wires 87 having a size of about 0.1 mm, the diameter of the sensor body 81 can be reduced to a value smaller than that of a sensor comprising a single amorphous ribbon, thereby making the sensor compact. In addition, the use of the amorphous wires causes an increase in the coefficient of magnetostriction, and the use of a plurality of wires causes a decrease in noise, so that the S/N ratio is improved and thus a significant increase in the detection accuracy is obtained.

Although the thin elongated tube 82 of the sensor body 81 is extended to a portion near the recess 15 on the side of the mount member 10 in this embodiment, the tube 82 may be extended along the inside of the recess 15. In this case, since the magnets 20A for temperature compensation are far from the end of the tube 82, even if a current is generated in the portion of the magnets 20A for temperature compensation due to the reflected wave of the ultrasonic wave generated from the end of the tube 82, this current is avoided from overlapping the original current e so that the current e can be more precisely detected.

Another embodiment of the present invention is described below with reference to FIGS. 11 and 12.

In this embodiment, some of the pins used for guiding the fibrous material are used as electrodes for leading out the lead wires of the drive coil and the detection coil to the outside.

Figure 11:
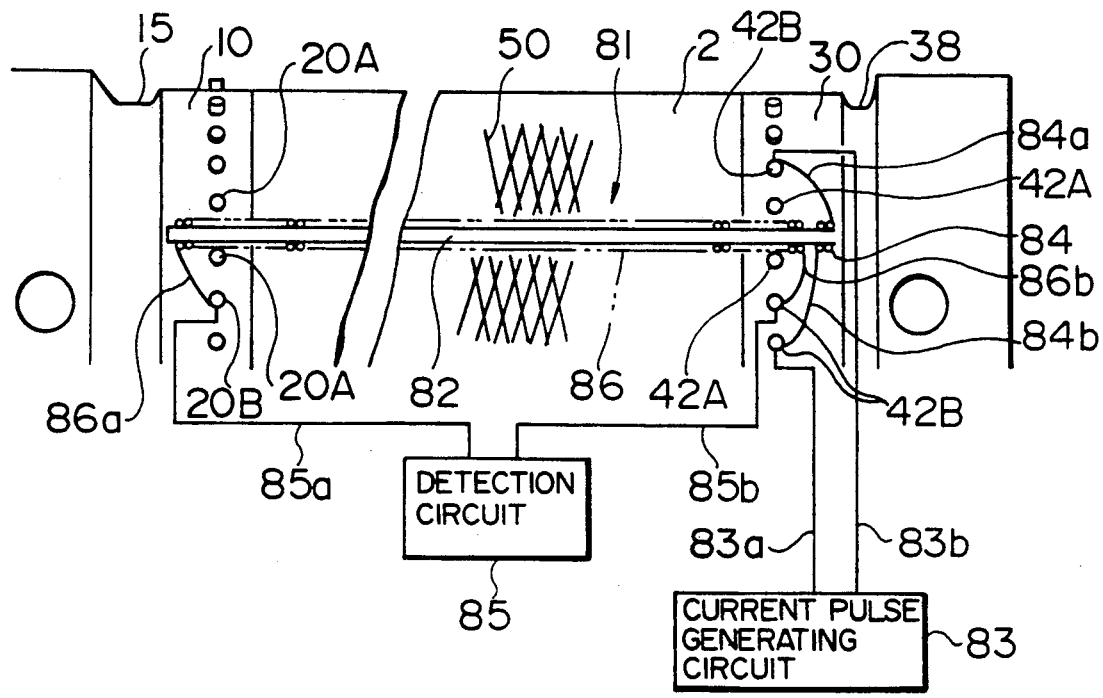
FIG. 11 is a plan view of a cylinder tube of another embodiment of the present invention before the formation of an outer cylinder.

In FIG. 11, a pin 20B, which is adjacent to one of pins 20A serving as temperature compensating magnets among the pins 20 provided on a mount member 110, also serves as an electrode, and three pins 42B, which are adjacent to pins 42A serving as temperature compensating magnets among the pins 42 provided on a mount member 30, also serve as electrodes, like the pin 20B. The winding ends 84a, 84b of a drive coil 84 are connected to the two pins 42B to which the wirings 83a, 83b of a current pulse generating circuit 83 are respectively connected so that the drive coil 84 is electrically connected to the current pulse generating circuit 83. One winding end 86a of a detection coil 86 is connected to the pin 20B, and the other winding end 86b is connected to the pin 42B. The wirings 85a, 85b of a detection circuit 85 are respectively connected to the electrodes 20B, 42B so that the detection coil 86 is electrically connected to the detection circuit 85.

Figure 12:
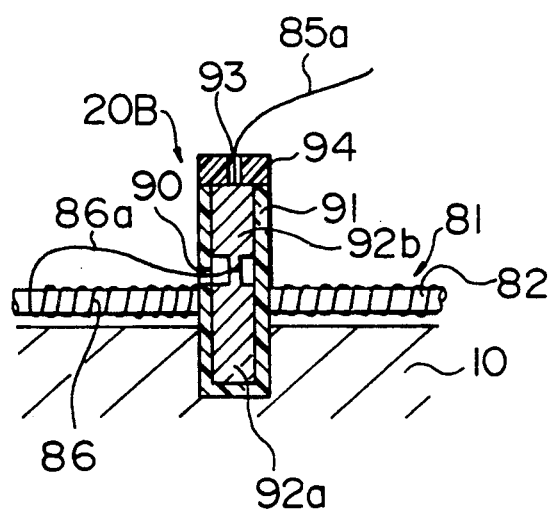
FIG. 12 is a sectional view of a pin also used as an electrode.

FIG. 12 shows the structure of the pin 20B as a representative of the structures of the pins 20B, 42B which serve as electrodes. The pin 20B comprises a hollow pin body 91 which has a closed bottom and a hole 90 opened in the side wall thereof and which is made of an insulating material such as a synthetic resin, asbestos, ceramics or the like, upper and lower electrode elements 92a, 92b which are contained in the pin body 91, and a cover 94 which closes the top of the pin body 91, which is provided with a hole 93 at the center thereof and which is made of the same insulating material as that of the pin body 91. The winding end 86a of the detection coil 86 is inserted into the pin body 91 through the hole 90 and held between the two electrode elements 92a, 92b so as to be electrically connected thereto. The end of the wiring 85a of the detection circuit 85 is inserted through the hole 93 of the cover 94 so as to be electrically connected to the electrode element 92b by soldering or the like.

In this embodiment, the pins 20B, 42B for guiding the fibrous material are employed as electrodes for leading out the lead wires of the drive coil and the detecting coil to the outside. This facilitates the leading out of the coil lead wires to the outside and the formation of the outer cylinder and causes the simplification of wiring for leading the coil lead wires to the outside and thus an improvement in reliability of the sensor.

A further embodiment of the present invention is described below with reference to FIG. 13. In this embodiment, a sensor body is disposed at a position different from that in the above embodiments.

Figure 13:
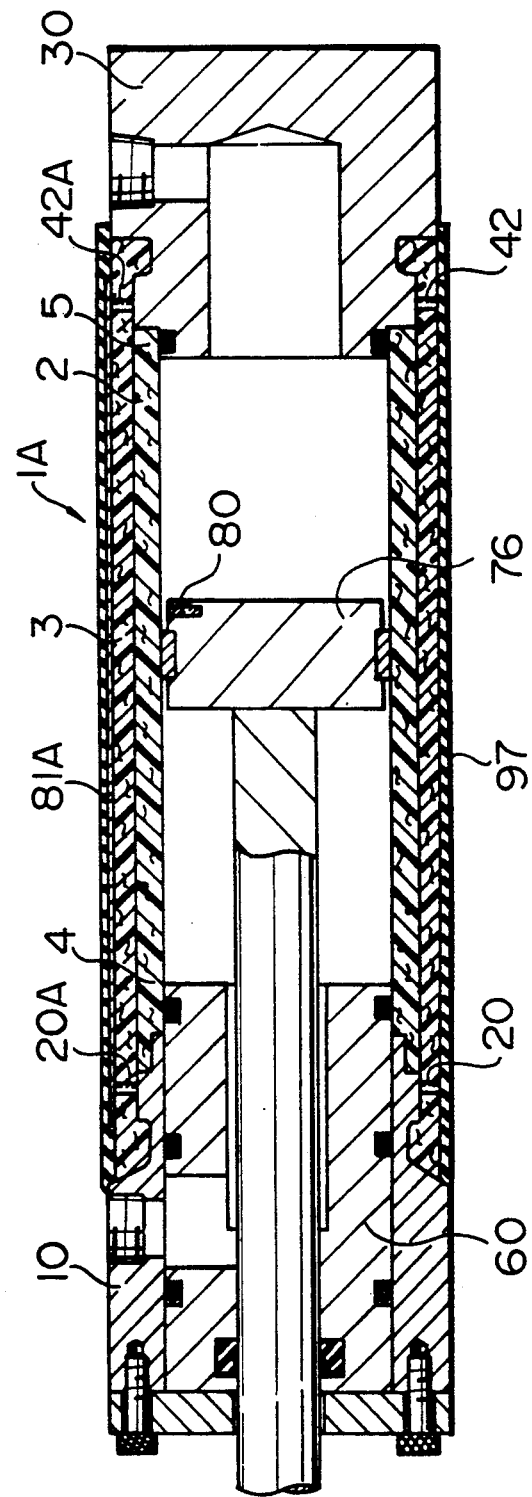
FIG. 13 is a sectional view of a cylinder apparatus in accordance with a further embodiment of the present invention.

In FIG. 13, a sensor body 81A is disposed on the outer periphery of an outer cylinder 3, and a protective layer 97 made of an elastic material is further provided on the outer periphery of an outer cylinder 3 and the sensor body 81A. For example, heat-shrinkable silicone rubber can be used as an elastic material, and the protective layer 97 is formed by inserting the outer cylinder 3 into a tubular member of the silicone rubber and then heating it. The silicone rubber may be heated at the same time as thermosetting of the outer cylinder 3.

In this embodiment, pins 20A, 42A, which are adjacent to a sensor body 81A, are used as temperature compensating magnets like in the first embodiment. This permits an increase in length of the reference distance for temperature compensation and precise determination of the position of the magnet and thus has the effect of improving the precision of temperature compensation using a small number of parts like in the first embodiment.

In addition, in this embodiment, since the sensor body 81A is disposed on the outside of the outer cylinder 3, the outer cylinder 3 can be easily formed. Since the protective layer 97 is provided on the outside of the sensor body 81A, the outer cylinder 3 and the sensor body 81 are protected from external impact.

Further, because the protective layer 97 causes the outer cylinder 3 to adhere to the inner cylinder 2 by virtue of heat shrinkage, both the cylinders are further strongly combined with each other, and the load acting on the pins 20, 20A, 42, 42A is dispersed and reduced. The protective layer also has the effect of preventing the ultraviolet degradation of the resin of the outer cylinder and consequently significantly improving the durability of the cylinder tube 1A.

Although, in each of the above-described embodiments, the pins 20, 42 are used as the protrusions for guiding the fibrous material, the protrusions may be formed by using other means. For example, two half-rings provided with a plurality of radial protrusions may be prepared and fitted in an annular groove provided in the mount members so that the protrusions of the half rings can be used as the protrusions for guiding the fibrous material. In this case, the whole of the half rings may be magnetized for providing the protrusions with the function as the temperature compensating magnets.

Although, in the above embodiment, the inner and outer cylinders are formed by using the filament winding method, they may be formed by using another method such as a tape winding method, a hand lay-up method or the like. In addition, the inner cylinder may be formed by using a short fiber-reinforced resin material and, if required, it may be formed by using another non-magnetic material such as stainless steel, aluminum, ceramics or the like.

Further, although, in the above embodiments, the drive coil is provided at only one end of the thin elongated tube, the drive coil may be disposed at both ends thereof. In this case, if one of the drive coils is damaged, the other drive coil can be used so that one of the drive coils serves as an auxiliary drive coil. Alternatively, a pulse current may be alternately applied to both the drive coils so that both drive coils can be used together. In this case, the stroke can be measured by using the data obtained from both drive coils, and the detection accuracy can be improved by averaging the measured values.

Industrial Availability

In the present invention, since the temperature compensating magnets of the stroke sensor are disposed near both ends of the cylinder tube, the reference distance for temperature compensation is increased, and the pins serving as the magnets can be easily seen from the outside. The present invention therefore has the effect of improving the accuracy of temperature compensation for a change in the environmental temperature such as the oil temperature or the like and thus enabling the precise measurement of the piston stroke.

In addition, the use of the pins for guiding the fibrous material as magnets for temperature compensation causes the simplification of the structure, the prevention of separation of the outer cylinder from the inner cylinder, which is easily produced in a case where an exclusive magnet is interposed between the inner and outer cylinders and thus an improvement in durability of the cylinder tube 1.

What is claimed is:

1. A cylinder apparatus made of a composite material comprising a cylinder tube having an inner cylinder made of a non-magnetic material and an outer cylinder formed on the outer periphery of said inner cylinder and made of a fiber-reinforced resin material, a piston slidably disposed in said cylinder tube, a rod having one end fixed to said piston and the other end outwardly projecting from said cylinder tube, a stroke sensor for detecting the stroke of said piston, said stroke sensor comprising a position indicating magnet provided on said piston and elongated sensor means provided on said cylinder tube, said elongated sensor means having a thin elongated tube extending along said cylinder tube between both ends thereof and containing at least one magnetostriction string having a large coefficient of magnetostriction, a drive coil wound on at least one of both ends of said thin elongated tube for producing magnetostriction phenomenon in said magnetostriction string for generating an ultrasonic wave when a pulsatile input current is applied thereto, a detection coil wound over a predetermined length of said thin elongated tube separately from said drive coil for detecting as a detection signal the induced electromotive force generated by the inverse magnetostriction phenomenon when said ultrasonic wave is passed through the position of said magnetostriction string corresponding to said position indicating magnet, and at least one pin-like magnet for correcting a measurement error due to a change in temperature of said stroke sensor, said at least one pin-like magnet being provided at each of positions axially inward of both ends of said detection coil and adjacent both ends of said cylinder tube.

2. A composite material cylinder apparatus according to claim 1, wherein said pin-like magnet is provided as a radial protrusion on each of two mount members fitted to the opposite axial ends of said inner cylinder, and said outer cylinder is formed by winding a fibrous material impregnated with a resin on the outer periphery of said inner cylinder while guiding it by said radial protrusion.

3. A cylinder apparatus made of a composite material according to claim 1, wherein said elongated sensor means is interposed between said inner cylinder and said outer cylinder.

4. A cylinder apparatus made of a composite material according to claim 1, wherein said elongated sensor means is disposed on the outer periphery of said outer cylinder, and a protective layer made of an elastic material is further coated on the outside of said sensor means.

5. A cylinder apparatus made of a composite material according to claim 2, wherein at least one other radial protrusion is further provided on at least one of said two mount members for guiding said fibrous material, said other protrusion comprising electrode means for leading out lead wires of said drive coil and said detection coil to the outside.

6. A cylinder apparatus made of a composite material according to claim 1, wherein said magnetorestriction string contains a plurality of amorphous wires.

7. A cylinder apparatus made of a composite material according to claim 2, wherein said elongated sensor means is interposed between said inner cylinder and said outer cylinder.

8. A cylinder apparatus made of a composite material according to claim 2, wherein said elongated sensor means is disposed on the outer periphery of said outer cylinder, and a protective layer made of an elastic material is further coated on the outside of said sensor means.

9. A cylinder apparatus made of a composite material according to claim 2, wherein said magnetostriction string contains a plurality of amorphous wires.

* * * * *